J. SMITH.
RAY PROTECTOR.
APPLICATION FILED FEB. 2, 1915.
1,231,213.
Patented June 26, 1917.
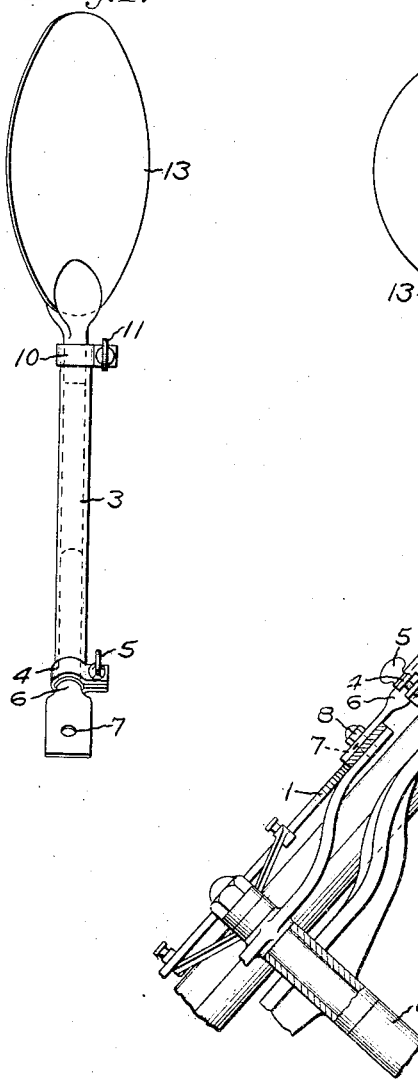
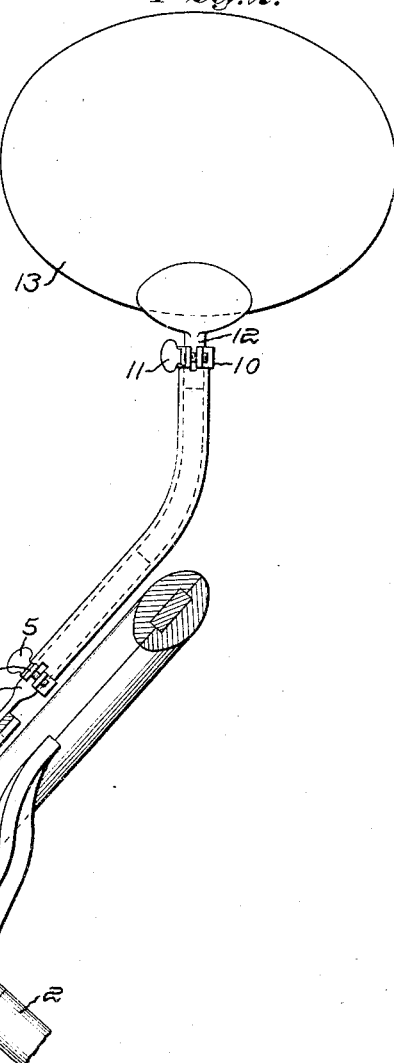
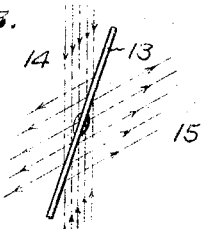
Witnesses:
Carl L. Choate.
Horace A. Crossman.
Inventor:
John Smith.

UNITED STATES PATENT OFFICE.

JOHN SMITH, OF CAMBRIDGE, MASSACHUSETTS.

RAY-PROTECTOR.

1,231,212.   Specification of Letters Patent.   Patented June 26, 1917.

Application filed February 2, 1915. Serial No. 5,800.

*To all whom it may concern:*

Be it known that JOHN SMITH, a citizen of the United States, and a resident of Cambridge, county of Middlesex, and Commonwealth of Massachusetts, has invented an Improvement in Ray-Protectors, of which the following description, in connection with the accompanying drawings, is a specification, like characters on the drawings representing like parts.

This invention relates to ray protectors for use on motor vehicles, boats, or any conveyance, to protect the eyes of the driver or pilot against an extremely bright light, particularly acetylene or electric, projected from an approaching vehicle or boat.

It is the particular object of this invention to provide a device that, by virtue of its novel construction, will not only effectually deflect the objectionable rays of light from the driver's eyes but also, because of such construction, will not, to any substantial degree, interfere with the view by the driver of the road, ahead of the vehicle.

For a better understanding of my invention, I have shown an illustrative embodiment thereof in the drawings, whereof—

Figure 1 is a view from the driver's seat, of the ray protector in position for use, on an automobile;

Fig. 2 is a side view thereof, from the side of the car, and

Fig. 3 is a diagrammatic illustration of the manner in which the rays of light are received and deflected by the shield.

The embodiment shown comprises primarily a substantially opaque light deflecting member of convenient size and configuration conveniently mounted on a conveyance in front of the driver, in such a position that it will receive rays of light directed toward it either from an approaching or following conveyance, and deflect them laterally from the line of vision of the driver.

While the light deflecting member may be carried on any convenient part of the car or other vehicle, I prefer to mount it, see Fig. 2, on the sector 1 of the wheel post 2, if the conveyance be an automobile, which, in all makes of cars, is stationary, and the protector is herein shown as so supported.

My improved protector, as illustrated, comprises a preferably tubular supporting member 3 carrying at its lower end a suitable locking device, as a clamping collar 4, by means of which, and its coöperating screw 5, the member 3 may be locked in desired adjustment to a post 6 slidable therein. The lower end of the post 6 may be flattened and provided with an aperture 7 to receive a screw or other suitable locking member 8 for locking it to the sector 1, which may be tapped or drilled for that purpose.

The support 3 is preferably bent upward near its opposite or outer end, and is also conveniently provided with a clamping collar 10 and screw 11, by means of which the stem 12 of the light deflecting member 13 may be adjustably clamped therein at the desired height to properly position the light deflecting member to shield the eyes of the driver.

The light deflecting member is illustrated as a thin disklike member, of convenient size and substantially elliptical in outline. It will be apparent that the elongated form of the light deflecting member acts to extend the width of the zone within which rays will be caught by it and deflected laterally, thus providing a maximum of protection to the eyes with a minimum of obstruction to the line of vision.

It is desired that the light deflecting member be as small as possible and still provide the necessary protection against the objectionable rays of light. Of course protectors, either partly or entirely oqaque, of any size or shape which are positioned substantially across the line of vision of the driver tend seriously to interfere with a clear view of the road. For this reason it has been common to make these protectors of transparent or semi-opaque material which diminish the intensity of the approaching light rays and also permits a dim view of the road, but without cutting them off or deflecting them, the idea having been to permit a view of the road through the protector. These protectors, however, permit sufficient rays of light from an approaching car to pass through them to seriously inconvenience the driver.

I have discovered, however, that by using a substantially opaque light deflecting member of convenient size and configuration, and positioning the same at a suitable angle to the line of vision of the driver, and thus at an angle to the direction of the rays of light projected from an approaching car, substantially all such rays which would otherwise blind the eyes of the driver may be caught and deflected laterally, away from his line of vision.

Furthermore, the deflecting member, while in this position, by virtue of its shape, thinness and the slight angle at which it is positioned, does not interfere materially with a clear view of the road by the driver, who may look on either or both sides of the edge presented to him. As already stated, Fig. 1 shows a preferred form of my invention as it appears to the driver, and it will be apparent that to no substantial degree does it interfere with a clear view of the road.

In Fig. 3 I have shown diagrammatically the manner in which any rays of light 14 projected against it by an approaching vehicle, are deflected to one side, out of the line of sight of the driver.

It is also a fact well known to drivers of automobiles that rays of light projected from the headlight of a following car will strike the wind shield or semi-opaque shield, such as I have described, and be reflected back by it, into the eyes of the driver, and my improved shield, see Fig. 3, acts also to catch and deflect laterally such rays 15 projected over the rear of or through the rear window of, a car.

During the day, if desired, the light deflecting member may be adjusted substantially to the longitudinal plane of the conveyance or to correspond with the line of vision of the driver, presenting its edge only to his vision, and then removing the member substantially entirely from the line of vision.

While I have herein illustrated and described one embodiment of my invention, it is to be understood that modifications in the detailed construction thereof may be made within the scope of the appended claims and without departing from the spirit of the invention.

Claims:

1. A ray deflector comprising a support, a curvilinear substantially opaque disk of substantially uniform thickness throughout and having a plurality of unequal diameters, movable on the support, presenting normally to the operator a thin vertical edge, and presenting, as adjusted for use, first a disk whose longest diameter is substantially vertical, and subsequently a disk whose longest diameter is substantially horizontal, proportionate to the degree of adjustment of the disk.

2. A ray deflector comprising a hollow supporting member, a post movably and adjustably locked therein, means for locking the post to a steering post, a thin, opaque light-deflecting disk having a stem on its edge movably locked to the opposite end of said supporting member, said disk being curvilinear in outline and adapted to be positioned edge-wise to the operator's line of vision and thus rendered substantially invisible when in inoperative position, and adapted also to be positioned in a plane angular to the operator's line of vision as an operative position to present an elliptical light-deflecting area and dark zone of desired elliptical outline and proportion for deflecting light rays projected toward the operator both from front and the rear.

In testimony whereof, I have signed my name to this specification, in the presence of two subscribing witnesses.

JOHN SMITH.

Witnesses:
EVERETT S. EMERY,
LLEWELLYN RICHARDS.